(12) United States Patent
Yen

(10) Patent No.: US 7,507,042 B2
(45) Date of Patent: Mar. 24, 2009

(54) LENS COVER APPARATUS FOR CAMERA

(75) Inventor: Jung-Chun Yen, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 481 days.

(21) Appl. No.: 11/321,112

(22) Filed: Dec. 29, 2005

(65) Prior Publication Data

US 2007/0025725 A1 Feb. 1, 2007

(30) Foreign Application Priority Data

Jul. 27, 2005 (TW) .............................. 94125455 A

(51) Int. Cl.
*G03B 17/00* (2006.01)
(52) U.S. Cl. ..................................... 396/448
(58) Field of Classification Search .................. 396/448
See application file for complete search history.

(56) References Cited

U.S. PATENT DOCUMENTS

| 117,318 | A | * | 7/1871 | Noble ......................... 396/448 |
| 3,836,985 | A | * | 9/1974 | Lange ......................... 396/448 |
| 4,681,418 | A | * | 7/1987 | Kodaira ....................... 396/73 |
| 4,864,338 | A | * | 9/1989 | Wakabayashi ............... 396/349 |
| 5,913,089 | A |   | 6/1999 | Ebe |
| 6,254,289 | B1 |  | 7/2001 | Manabe et al. |
| 6,926,453 | B2 | * | 8/2005 | Hisamatsu ................... 396/349 |

* cited by examiner

*Primary Examiner*—W. B. Perkey

(57) ABSTRACT

A lens cover apparatus for camera includes a housing, a cover, and a slider. The cover is rotatably mounted to the housing to open/close a lens window for selectively exposing/shielding a lens of the camera. The slider is manually movable with respect to the housing to induce a horizontal movement of a first linkage, which is converted into a rotary motion of the cover by a second linkage that has a lever forming a slot movably receiving and guiding a peg extending from the cover.

9 Claims, 5 Drawing Sheets

LENS COVER APPARATUS FOR CAMERA

BACKGROUND OF THE INVENTION

1. Field of the Invention

The present invention relates to a sliding type lens cover apparatus for camera, and more particularly, to a lever-driven sliding type lens cover apparatus for camera.

2. Description of the Related Arts

In photography, the quality of an image is generally dependent on the film in the conventional camera or the CCD in the digital camera, and the lens. However, physical damages, such as flaws and scars, caused by undesired or accidental contact of the lens by a rigid object, and contaminations caused by dirt, grease, and fingerprints, often make problems in the maintenance of the lens, which seriously affects the quality of the image. It is thus very important to protect the lens in doing maintenance of the camera. In practice, lens covers are often adopted to protect the lens.

The conventional lens covers can be divided into two types: clipping type covers and mechanical type covers.

The clipping type cover is a disc-like device, and usually has a pair of clips to releasably engage with the lens barrels to fix the cover in front of the lens. Most of the clipping type covers are separate parts, independent of the cameras, and are usually tied to the cameras with strings to avoid being lost. These covers are very common in the conventional cameras, but not used so often in the digital camera industry.

The mechanical type covers can be divided into motor-driven type covers and hand-driven type covers. Both types employ mechanics to selectively open/close the cover and thus exposing/shielding the lens. U.S. Pat. No. 5,913,089 (the '089 patent) and U.S. Pat. No. 6,254,289 (the '289 patent) respectively describe a lens barrel cover of this type. The two similar inventions are both based on the same theory, which enables an element with short moment arm (such as the barrier driving lever in the '089 patent and the power gear in the '289 patent) to drive another element with long moment arm (such as the main-barrier cover and the sub-barrier cover in the '289 patent and the lens cover in the '089 patent). However, according to the lever principle, in order to work an element with long moment arm, the element with short moment arm needs a large force. Thus, such conventional designs bring in difficulty in operation.

Hence, an improved lens cover apparatus for camera is required to overcome the disadvantages of the prior art.

SUMMARY OF THE INVENTION

An object of the present invention is to provide a lens cover apparatus for camera, which opens/closes a lens cover with a minor movement and a small force.

A lens cover apparatus for camera in accordance with the present invention comprises a housing, a cover, and a slider. The cover is rotatably mounted in the housing to open/close a lens windows to selectively expose/shield a lens of the camera. The slider is manually movable with respect to the housing to induce a horizontal movement of a first linkage, which is converted into rotary motion of the cover by a second linkage that has lever forming a slot movably receiving and guiding a peg extending from the cover.

The present invention enables easy operation of the cover, simplifies the process, and mostly saves the force of the operation of the cover. In addition, the present invention adopts a multi-linkage design of single freedom, which ensures a steady and reliable system.

Other objects, advantages, and novel features of the invention will become more apparent from the following detailed description of a preferred embodiment when taken in conjunction with the accompanying drawings, wherein:

BRIEF DESCRIPTION OF THE DRAWINGS

FIG. 3b is a pictorial view showing a back view of FIG. 3a;

FIG. 4b is a pictorial view showing a back view of FIG. 4a; and

DETAILED DESCRIPTION OF THE PREFERRED EMBODIMENT

Figure 1:
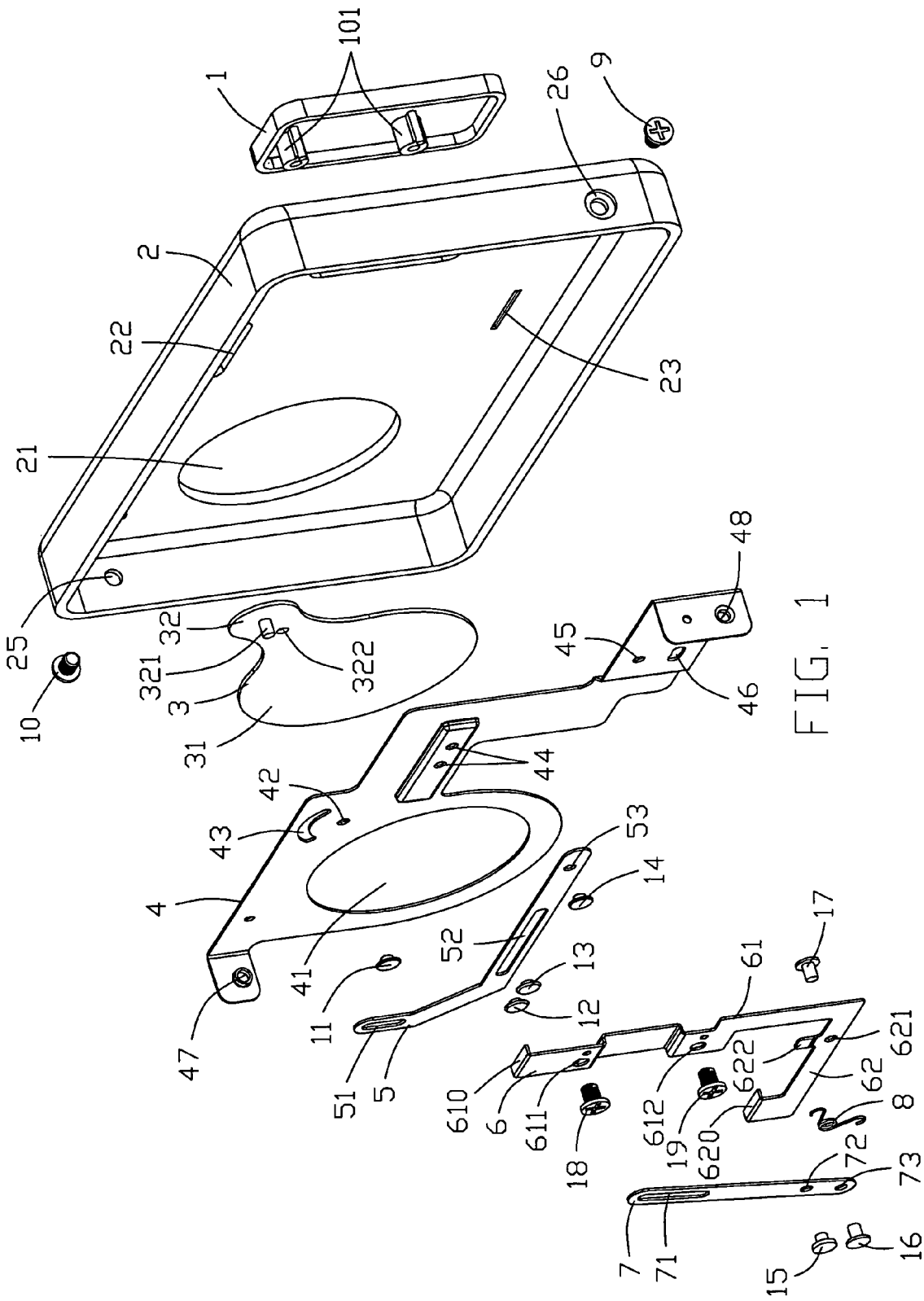
FIG. 1 is a plan view of a lens cover apparatus for camera in accordance with the present invention.
Figure 2:
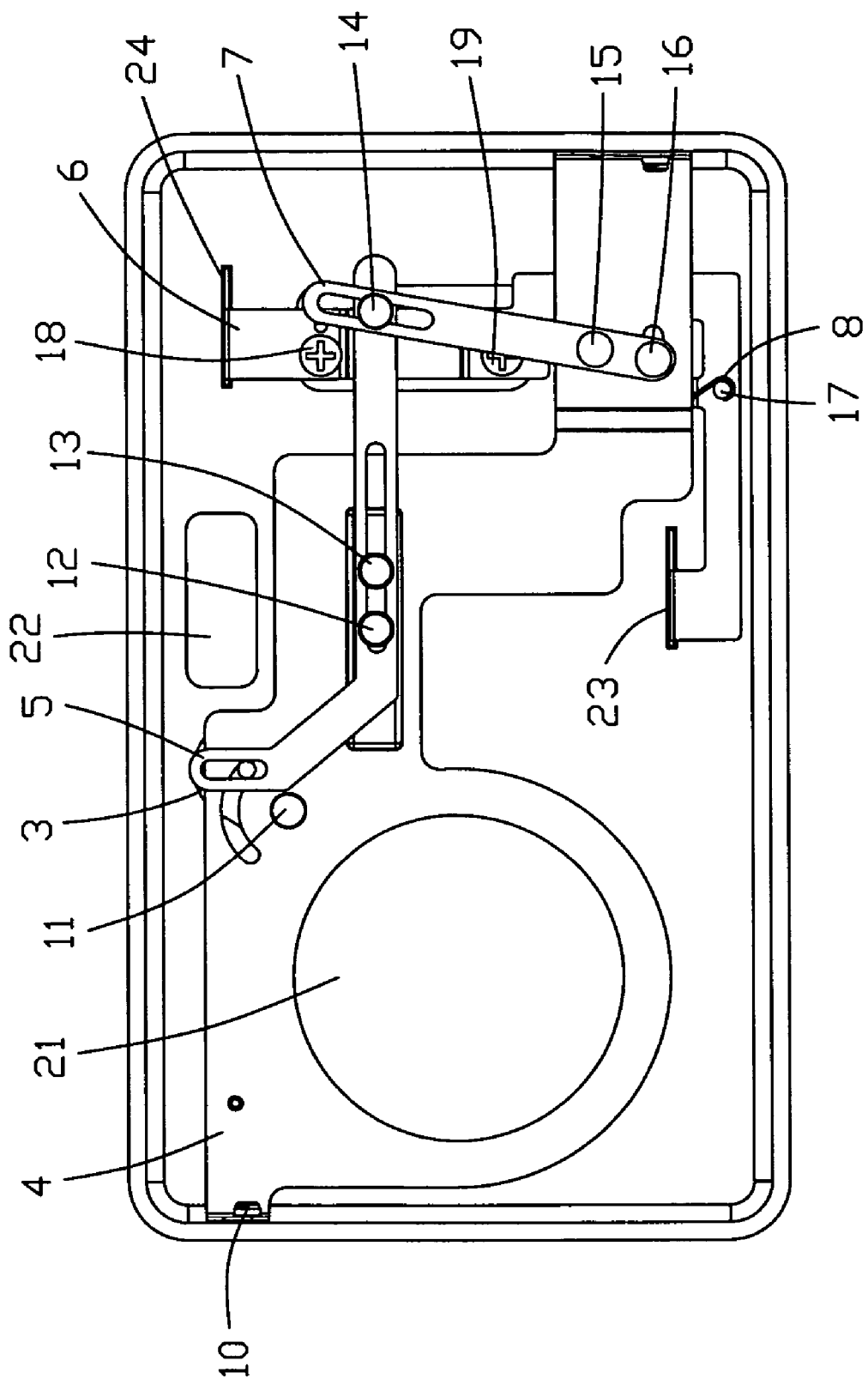
FIG. 2 is an exploded view of the lens cover apparatus in FIG. 1.
Figure 3A:
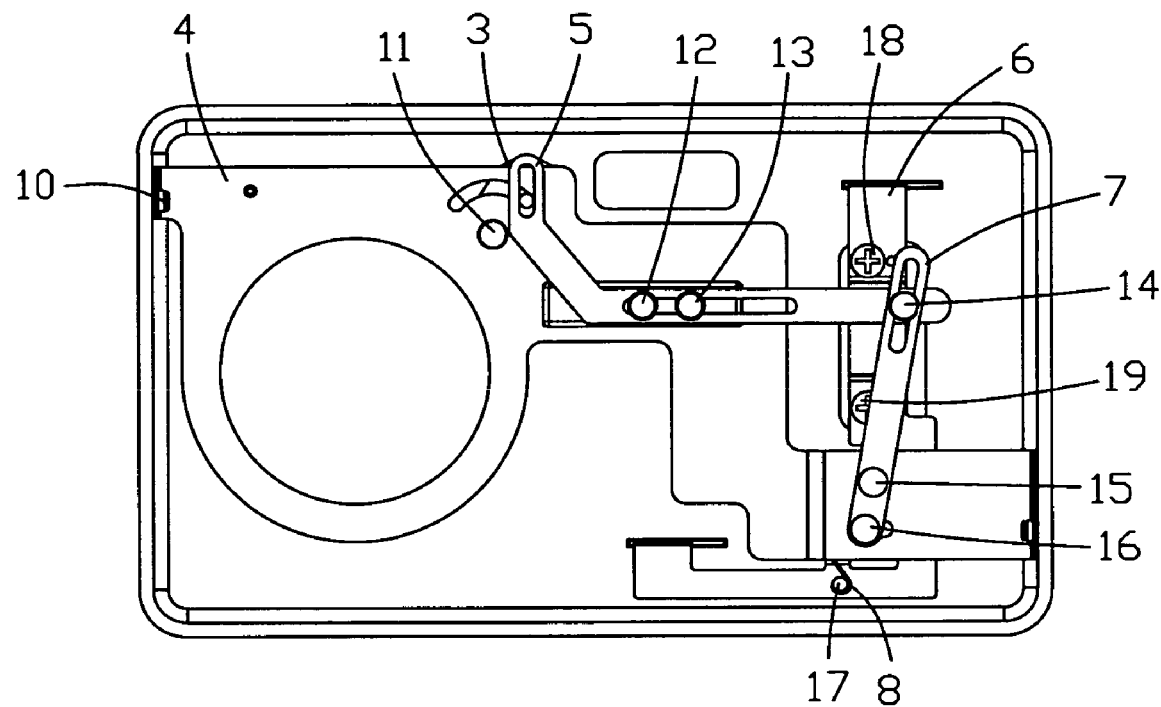
FIG. 3a is a pictorial view of the lens cover apparatus showing the cover in a closed position.
Figure 3B:
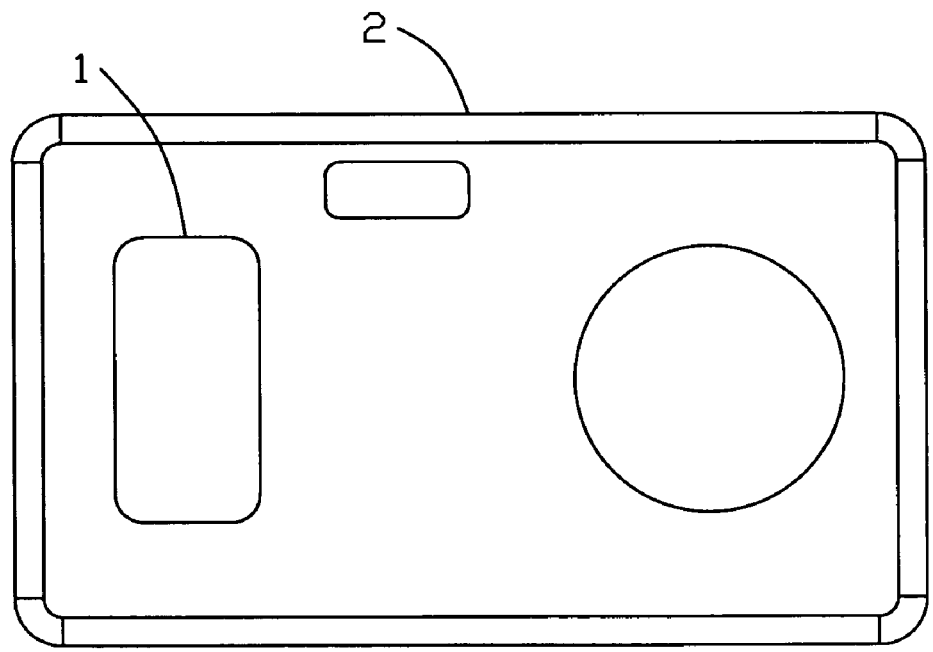
Figure 4A:
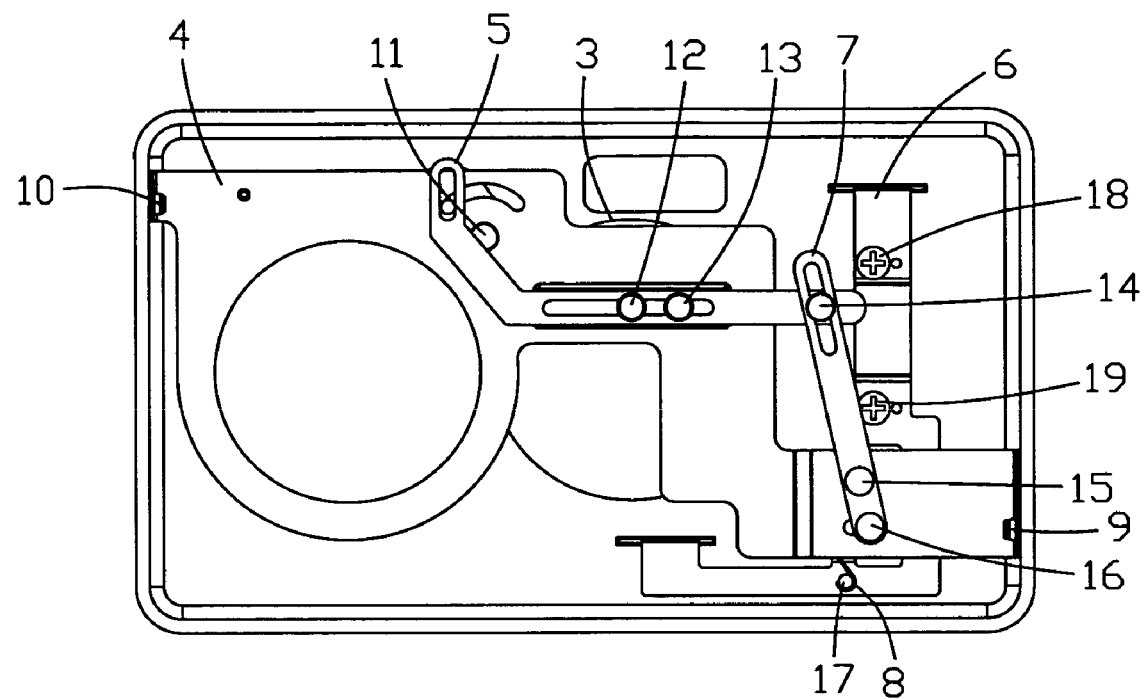
FIG. 4a is a pictorial view of the lens cover apparatus showing the cover is an open position.
Figure 4B:
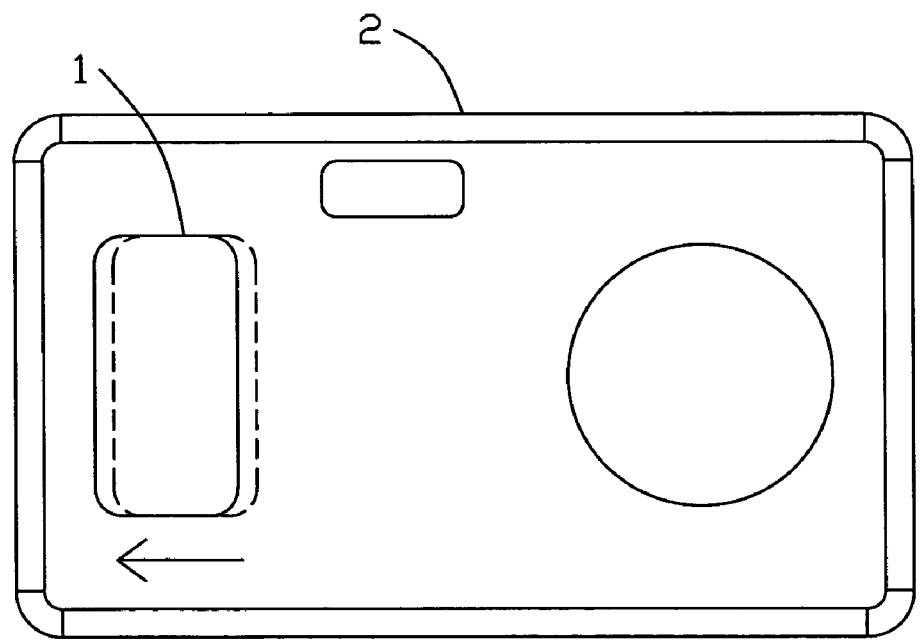
Figure 5:
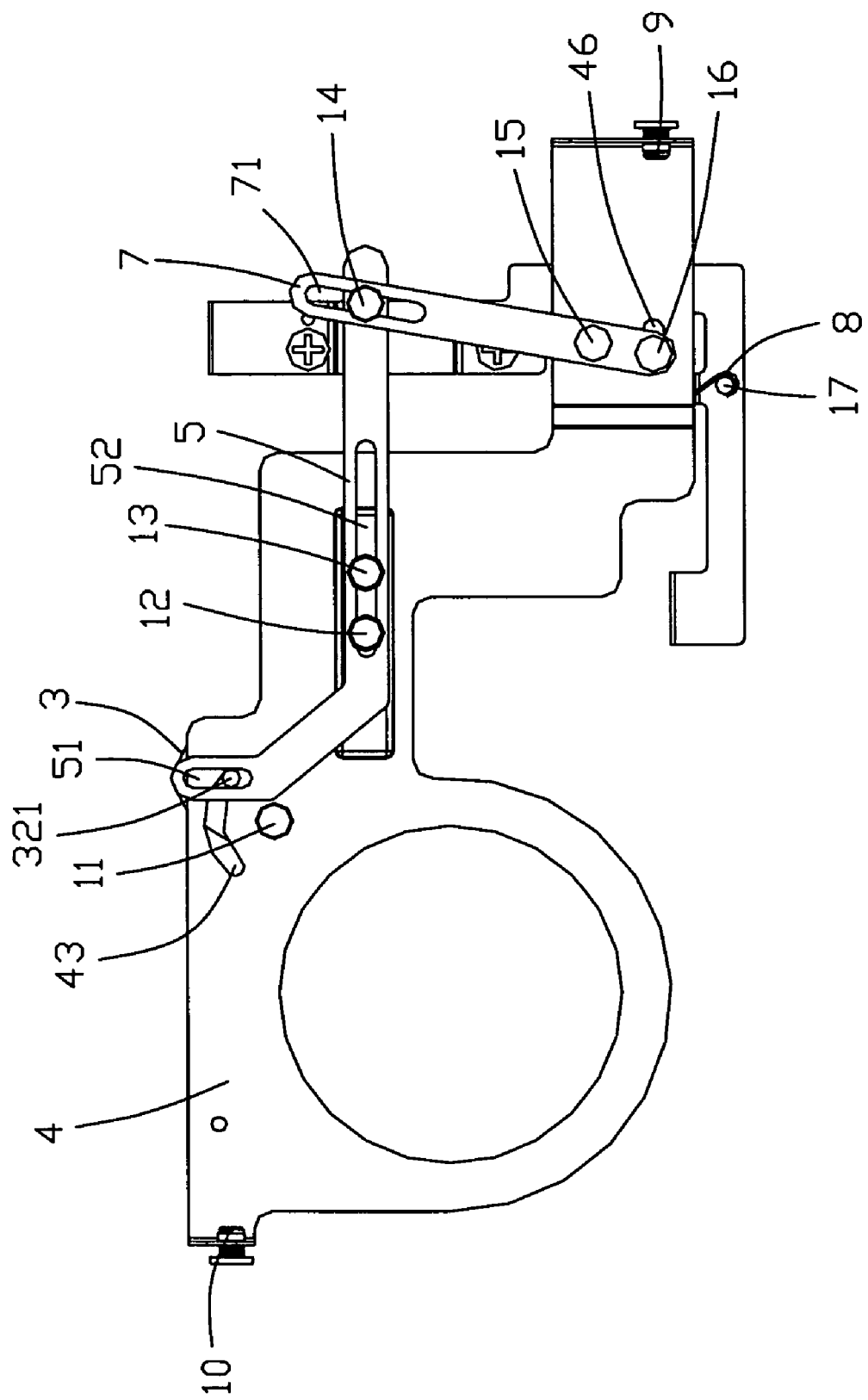
FIG. 5 is a pictorial view showing the operation of the lens cover apparatus.

With reference to the drawings and particular to FIGS. 1 and 2, a lens cover apparatus for camera in accordance with the present invention comprises a housing 2, a slider 1 movably arranged with the housing 2, a cover 3 for shielding/exposing a lens of a camera (both not shown), a fixing plate 4 fixed in the housing 2, an L-shaped lever 6 fixed to the slider 1 and movably arranged in the housing 2, a horizontal lever 5, a vertical lever 7, a plurality of screws 9, 10, 18, 19, a plurality of rivets 11, 12, 13, 14, 15, 16, 17, and a spring 8.

The slider 1 has a small flat rectangular case-like shape, and is formed with a pair of posts 101 perpendicularly extending from a back surface thereof. Each post 101 defines an inner thread in a concave hole, serving as a screw hole, to engage the screw 18, 19 thereby fixing to the L-shaped lever 6.

The housing 2 is substantially a flat rectangular hollow case having an open side. The housing 2 forms a circular lens window 21 for the lens of the camera, a flash window 22 for a flash (not shown) of the camera, a pair of slits 23, 24, and an opening (not labeled) for the extension of the posts 101 of the slider 1. The housing 2 has a left wall and a right wall, which respectively define first and second. screw holes 25, 26 near a top portion and a bottom portion to fix the fixing plate 4 inside the housing 2.

The cover 3 is arranged inside the housing 2 to close/open the lens window 21. The cover 3 comprises a main plate portion 31 of a circular shape and a connecting portion 32 smoothly extending from an external circumference of the main plate portion 31. The main plate portion 31 is of a size substantially corresponding to and selectively and completely covering the lens windows 21. The connecting portion 32 has a peg 321 perpendicularly extending from the connecting portion 32, and a first fixing hole 322 formed in the connecting portion 32 at a location on an imaginary line connecting the peg 321 and a center of the circle of the main plate portion 31.

The fixing plate 4 comprises a ring portion and a Z-shaped portion. The ring portion forms a lens hole 41, corresponding in position to the lens windows 21, for exposing the lens, a second fixing hole 42 corresponding to the first fixing hole 322, and a first arc groove 43 centered at the second fixing hole 42 and corresponding to and receiving therein the peg 321. An upper horizontal section of the Z-shaped portion has second coupling holes 44. A lower horizontal section of the Z-shaped portion has a third fixing hole 45, and a second arc groove 46 centered at the third fixing hole 45. The fixing plate 4 also defines third and fourth screw holes 47 and 48 corresponding to and fixed with the first and second screw holes 25 and 26 of the housing 2 by the screws 9 and 10.

The horizontal lever 5 is composed of a vertical portion and a horizontal portion. The vertical portion defines a third groove 51, which extends vertically and receivingly engages with the peg 321. The horizontal portion defines a horizontal groove 52 corresponding to the second coupling hole 44, and a third coupling hole 53 at a free end thereof.

The L-shaped lever 6 comprises a vertical branch 61 and a horizontal branch 62. The vertical branch 61 and the horizontal branch 62 each have a free end bent in the same direction to form a coupling end 610, 620. A middle portion of the vertical branch 61 is laterally offset in the same direction as the coupling ends 610 and 620 thereby forming a protruded section (not labeled). Third and fourth screw holes 611, 612 are respectively defined on opposite sides of the protruded portion and corresponding to the posts 101. The horizontal branch 62 also forms a first coupling hole 621, and a tip 622 adjacent to the first hole 621.

The vertical lever 7 defines a fourth groove 71 at an upper portion, and fourth and fifth coupling holes 72, 73 at a lower portion. The fourth groove 71 couples with the third coupling hole 53 with the rivet 14, so that the vertical lever 7 links with vertical lever 5.

The spring 8 is a torsion spring, having two free arms each having a bent end to fix to other elements.

In assembly, the coupling ends 610, 620 of the L-shaped lever 6 respectively couple with the slits 23 and 24 to retain the L-shaped lever 6 in the housing 2. The protruded section of the L-shaped lever 6 protrudes beyond the opening of the housing 2, through which the posts 101 of the slider 1 extend, and comes into contact with the back surface the slider 1 in between the posts 101. The screws 18, 19 respectively joint the third and fourth coupling holes 611, 612 to the posts 101 thereby fixing the slider 1 to the L-shaped lever 6. The cover 3 lies on the inside surface of the housing 2, with the main body of the cover 3 covering the lens windows 21, and the peg 321 projecting backward. The fixing plate 4 is positioned on the cover 3 and the L-shaped lever 6. The rivet 11 extends through the second fixing hole 42 and the first fixing hole 322 to joint the cover 3 to the fixing plate 4 with the peg 321 movably received in the first groove 43. In this way, the cover 3 is rotatable about the rivet 11 extending through the first or second fixing hole 322, 42, which in turn selectively opens and closes the lens windows 21. The fixing plate 4 is then fixed to the housing 2 by the screws 9, 10 that joint the third and fourth screw holes 47, 48 of the fixing plate 4 to the first and fourth screw holes 25, 26 of the housing 2. The horizontal lever 5 lies on the fixing plate 4. The rivets 12, 13 joint the second coupling holes 44 of the fixing plate 4 to the horizontal grooves 52 of the horizontal lever 5. The third groove 51 receives the end of the peg 321. Thus, the horizontal lever 5 is horizontally movable under guidance by the rivets 12, 13 fixed to the second coupling holes 44, which exerts a horizontal force on the peg 321 to rotate the cover 3 about the rivet 11. The vertical lever 7 lies on the horizontal lever 5 with the rivets 14, 15, 16 respectively jointing the third coupling hole 53, the third fixing hole 45, and the second groove 46 to the fourth groove 71, the fourth coupling hole 72, and the fifth coupling hole 73. The rivet 17 joints with the first coupling hole 621. The spring 8 lies between the fixing plate 4 and the L-shaped lever 6, and is fixed by the tip 622 from shaking or breaking off. One arm of the spring 8 is fixed with the rivet 17, and the other is fixed with the rivet 16.

Referring to FIGS. 3a, 3b, 4a, 4b, and 5, to operate, a user pushes the slider 1 to open the cover 3. Taking FIG. 5 as an example to describe the operation, when the user pushes the slider 1, the L-shaped lever 6 moves leftward with the slider 1 due to the fact that the L-shaped lever 6 is fixed to the slider 1 by the screws 18, 19. The spring 8 is then distorted, because one arm of the spring 8 is fixed to the rivet 17 that is fixed on the L-shaped lever 6. This applies, via the other arm of the spring 8 that is fixed with the rivet 16, a rightward force to the vertical lever 7, causing the vertical lever 7 to swing clockwise. The rivet 14 coupling the fourth grooves 71 of the vertical lever 7 to the horizontal lever 5 induces a horizontal force on the horizontal lever 5, causing the horizontal lever 5 to move, under the guidance of the rivets 12, 13 received in the horizontal groove 52, in the horizontal direction and thus driving the peg 321 through the third groove 51. The cover 3 is then forced to rotate clockwise about the rivet 11.

In a reversed operation, the user pushes the slider 1 to return to the initial position. The L-shaped lever 6 moves with the slider 1, and exerts a force on the spring 8. The spring 8 drives the vertical lever 7 to swing counterclockwise, and causes the horizontal lever 5 to move and thus driving the peg 321 along the first groove 43 for rotating the cover 3 to close the lens window 21.

The present invention enables easy operation of the cover 3, simplifies the process, and mostly saves the force of the operation of the cover 3. In addition, the present invention adopts a multi-linkage design of single freedom, which ensures a steady and reliable system.

It will be understood that the present invention may be embodied in other specific forms without departing from the spirit or central characteristics thereof. The present examples and embodiments, therefore, are to be considered in all respects illustrative and not restrictive, and the invention is not be limited to the details given herein.

What is claimed is:

1. A lens cover apparatus for camera, comprising:
    a housing defining a lens window for selectively exposing a lens of a camera;
    a cover movably mounted on the housing to openably close the lens window;
    a slider movably mounted on the housing, and adapted to receive an external force by manual operation;
    a first linkage operatively fixed to and driven the slider;
    a second linkage jointing the first linkage to the cover for driving and thus selectively opening the cover; and
    a fixing plate fixed in the housing to rotatably support the cover, the cover comprising a peg and a first fixing hole, the fixing plate forming a second fixing hole and a first groove centered at the second fixing hole, a rivet through the first and second fixing holes to rotatably fix the cover to the fixing plate, and the peg movably received in the first groove to guide the rotation of the cover with respect to the fixing plate and the housing.

2. The lens cover apparatus as claimed in claim 1, wherein the fixing plate is formed with a pair of screw holes, and is fixed to the housing by screws engaging the screw holes.

3. The lens cover apparatus as claimed in claim 1, wherein the first linkage comprises a L-shaped lever, which forms coupling ends, and the housing defines slits slidably and respectively receiving the coupling ends therein to movably mount the L-shaped lever of the first linkage to the housing.

4. The lens cover apparatus as claimed in claim 3, wherein the second linkage comprises a horizontal lever and a vertical lever, the horizontal lever being horizontally movably mounted on the fixing plate and in driving engagement with the peg to rotate the cover, the vertical lever drivingly coupling the horizontal lever to the lever of the first linkage.

5. The lens cover apparatus as claimed in claim 4, wherein the vertical lever defines a fourth coupling hole and the fixing plate correspondingly defines a third fixing hole, a rivet trough the fourth coupling hole and the third fixing hole to rotatably mount the vertical lever to the fixing plate, and wherein the vertical lever comprises a projection movably received in a second arc groove formed in the fixing plate and centered at the third fixing hole to guide the rotation of the vertical lever with respect to the fixing plate.

6. The lens cover apparatus as claimed in claim 5 further comprising a resilient member arranged between and interconnecting the first linkage and the second linkage.

7. The lens cover apparatus as claimed in claim 6, wherein the resilient member comprises a torsional spring having two arms respectively fixed to the lever of the first linkage and the projection of the vertical lever.

8. The lens cover apparatus as claimed in claim 4, wherein the horizontal lever forms a horizontal groove in which a projection formed on the fixing plate is slidably received to guide the horizontal movement of the horizontal lever.

9. The lens cover apparatus as claimed in claim 4, wherein the horizontal lever defines a third groove that movably receives the peg of the cover thereby forming the driving engagement between the horizontal lever and the peg.

* * * * *